(12) United States Patent
Christofi et al.

(10) Patent No.: US 11,855,906 B2
(45) Date of Patent: Dec. 26, 2023

(54) NORTHBOUND INTENT-BASED DYNAMIC APPLICATION INTERFACE

(71) Applicant: eBOS Technologies, Nicosia (CY)

(72) Inventors: Loizos Christofi, Nicosia (CY); Stelios Christofi, Nicosia (CY); Fanos Christofi, Nicosia (CY)

(73) Assignee: eBOS Technologies, Nicosia (CY)

( * ) Notice: Subject to any disclaimer, the term of this patent is extended or adjusted under 35 U.S.C. 154(b) by 0 days.

(21) Appl. No.: 17/579,653

(22) Filed: Jan. 20, 2022

(65) Prior Publication Data
US 2022/0182332 A1 Jun. 9, 2022

(51) Int. Cl.
*H04L 47/762* (2022.01)
*H04L 47/78* (2022.01)
*H04L 47/80* (2022.01)
*G06K 9/62* (2022.01)
*H04W 4/50* (2018.01)
*G06F 18/214* (2023.01)

(52) U.S. Cl.
CPC .......... *H04L 47/762* (2013.01); *G06F 18/214* (2023.01); *H04L 47/781* (2013.01); *H04L 47/803* (2013.01); *H04W 4/50* (2018.02)

(58) Field of Classification Search
CPC ... H04L 47/762; H04L 47/781; H04L 47/803; H04W 4/50; G06K 9/6256
USPC ........................................................ 709/226
See application file for complete search history.

(56) References Cited

U.S. PATENT DOCUMENTS

| 10,826,775 | B1 * | 11/2020 | Moreno | .................. H04L 45/34 |
| 11,165,667 | B2 * | 11/2021 | Dippenaar | .......... H04L 67/1097 |
| 2015/0381515 | A1 * | 12/2015 | Mattson | .................. H04L 47/70 707/722 |

(Continued)

FOREIGN PATENT DOCUMENTS

CN 106160212 A * 11/2016

OTHER PUBLICATIONS

3GPP, "3GPP TS28.531 V16.4.0", Dec. 2019, 3rd Generation Partnership Project, https://portal.3gpp.org/desktopmodules/Specifications/SpecificationDetails.aspx?specificationId=3274 (Year: 2019).*

(Continued)

*Primary Examiner* — Ruolei Zong
(74) *Attorney, Agent, or Firm* — CRGO Global; Steven M. Greenberg

(57) ABSTRACT

Northbound intent-based application insertion may be employed within a mobile communications network established with a software defined network (SDN) including both an applications plane and also a control plane in which different infrastructure resources are accessible through a northbound API. A request from a mobile application first is received in the control plane for the application to be inserted into the application layer utilizing different infrastructure resources of the control plane. The mobile application is then characterized and a set of recommended resources for the characterization retrieved. Finally, those of the resources to be utilized by the mobile application are compared to the set of recommended resources in order to identify a variance of resources and the resources to be utilized by the mobile application, as adjusted by the variance of resources, are then provisioned for use by the mobile application.

18 Claims, 2 Drawing Sheets

(56) References Cited

U.S. PATENT DOCUMENTS

| | | | | |
|---|---|---|---|---|
| 2018/0063847 | A1* | 3/2018 | Huang | H04W 28/16 |
| 2018/0322118 | A1* | 11/2018 | Hu | H04L 41/0896 |
| 2018/0332441 | A1* | 11/2018 | Shaw | H04W 36/26 |
| 2019/0058508 | A1* | 2/2019 | Yiu | H04B 7/043 |
| 2020/0186411 | A1* | 6/2020 | Ravichandran | H04L 41/5009 |
| 2020/0322230 | A1* | 10/2020 | Natal | H04L 47/10 |
| 2020/0344663 | A1* | 10/2020 | Dowlatkhah | H04L 47/70 |
| 2021/0044539 | A1* | 2/2021 | Kottapalli | H04L 63/02 |
| 2022/0038361 | A1* | 2/2022 | Tseng | H04L 43/06 |
| 2022/0132219 | A1* | 4/2022 | Maria | H04N 21/6131 |

OTHER PUBLICATIONS

Joe Barger, "CCNA 7.7.c: Northbound and southbound APIs", Feb. 2019, eConfigs.com, https://www.econfigs.com/ccna-7-7-c-northbound-and-southbound-apis/ (Year: 2019).*

Poonam Vijay Tijare et al., "The Northbound Apis of Software Defined Networks", Oct. 2016, International Journal of Engineering Sciences & Research Technology, http://www.ijesrt.com/issues%20pdf%20file/Archive-2016/October-2016/61.pdf (Year: 2016).*

Arash Shaghaghi et al., "Software-Defined Network (SDN) Data Plane Security: Issues, Solutions and Future Directions", Apr. 2018, ResearchGate.net, https://www.researchgate.net/publication/324167015_Software-Defined_Network_SDN_Data_Plane_Security_Issues_Solutions_and_Future_Directions (Year: 2018).*

* cited by examiner

NORTHBOUND INTENT-BASED DYNAMIC APPLICATION INTERFACE

CROSS REFERENCE TO RELATED APPLICATIONS

This application claims priority under 35 U.S.C. § 119(a) to French patent application FR2100520 filed on Jan. 20, 2021, the entire teachings of which are incorporated herein by reference.

BACKGROUND OF THE INVENTION

Field of the Invention

The present invention relates to the field of network resource allocation in a communications network and more particularly to network resource allocation in a software defined network based upon a classification of an application that causes network traffic and requests the use of network resources.

Description of the Related Art

The software defined network (SDN) is a technology that separates the control plane management of different connected network devices, from the underlying data plane that forwards network traffic to the devices. In this regard, an SDN architecture features software-defined controllers abstracted from the underlying network hardware, while offering intent-based or policy-based management of the network as a whole. This results in a network that is better aligned with the needs of application workloads through automated provisioning, programmatic network management, pervasive application-oriented visibility, and where needed, direct integration with cloud orchestration platforms.

The separation of the control from the data plane in a network architecture remains the paramount feature of the SDN. Yet, SDN is more in that the SDN has a centralized or distributed intelligent entity that enjoys an entire view of the network, so as to make routing and switching decisions based on that view. In comparison, legacy network routers and switches only know about neighboring network gear. However, with a properly configured SDN environment, that central entity can control everything, from easily changing policies to simplifying configuration and automation across the enterprise. As can be seen, the principle of the SDN can find wide applications not just in connection with the management of a computer communications network, but also in the implementation and management of a cellular telecommunications network incorporating a computer communications network. As to the latter, the SDN forms an integral part in the current and emerging cellular telephony space such as 5G.

The SDN includes two different application programming interfaces (APIs): southbound and northbound. The southbound interface is the protocol specification that enables communication between controllers and switches and other network nodes, which is with the lower-level components. The southbound interface further allows the router to identify network topology, determine network flows and implement request sent to it via northbound interfaces. In contrast, the northbound interface allows communication amongst the higher-level components. While a traditional network relies upon a firewall or load balancer to control data plane behavior, the SDN installs applications that use the controller and these applications communicate with the controller through its northbound interface (NBI).

Of note, the NBI provides the functionality necessary for applications seeking deployment in the SDN to ensure that the desired resources including memory and processor resources are available and allocated to the applications in a self-service model. To that end, the NBI in the SDN—particularly in the mobile communications network model such as 5G—usually is static in form. As such, when deploying an application to the mobile network, the application can configure its desired resources only in so far as an understanding exists between the application to be deployed and the current state of the NBI. But the NBI can change over time. Whenever the NBI changes, supported applications must adapt at the source code level, recompile and redeploy. As well, a stub is required for each deployed application so that the controller can receive the stub and then enjoy the ability to communicate with the application.

BRIEF SUMMARY OF THE INVENTION

Embodiments of the present invention address deficiencies of the art in respect to application insertion into a mobile communications network and provide a novel and non-obvious method, system and computer program product for northbound intent-based application insertion into a mobile communications network. In an embodiment of the invention, a method for northbound intent-based application insertion is employed within a mobile communications network established with an SDN including both an applications plane and also a control plane in which different infrastructure resources are accessible through a northbound API. The method includes receiving in the control plane, a request from a mobile application to be inserted into the application layer utilizing different ones of the infrastructure resources of the control plane. The method also includes characterizing the mobile application and retrieving a set of recommended ones of the different infrastructure resources for the characterization of the mobile application. Finally, the method includes comparing those of the resources to be utilized by the mobile application to the set of recommended resources in order to identify a variance of resources and provisioning for use by the mobile application in the control plane, the resources to be utilized by the mobile application adjusted by the variance of resources.

In one aspect of the embodiment, the variance refers to additional resources included in the set of recommended resources but not included in the resources to be utilized by the mobile application so as to require an adjustment of the resources to be utilized by the mobile application by adding the additional resources to the provisioning. Oppositely, in another aspect of the embodiment, the variance refers to additional resources included in the resources to be utilized by the mobile application that have not been included in the set of recommended resources so as to require an adjustment of the resources to be utilized by the mobile application by removing the additional resources from the provisioning.

In yet a further aspect of the embodiment, the resources to be utilized by the mobile application are specified by the mobile application through the northbound API. But, in a more complex aspect of the embodiment, the resources to be utilized by the mobile application are correlated with the characterization of the mobile application. To that end, the correlation is determined by submitting meta-data associated with the mobile application to a classifier trained to produce a characterization responsive to application meta-data.

In another embodiment of the invention, a data processing system can be adapted for northbound intent-based application insertion into a mobile communications network. The system includes a host computing platform disposed within a central unit (CU) of an SDN architected cellular communications network. The CU includes a communicative coupling to a multiplicity of different distributed units (DUs), with at least one of the DUs including a massive multiple input, multiple output (MIMO) antenna transmitting over millimeter wave frequencies. Of note, the platform includes one or more computers, each with memory and at least one processor and an SDN established in the host computing platform. Finally, the system includes a network controller disposed within a control plane of the SDN.

The network controller includes computer program instructions enabled while executing in the host computing platform to receive in the control plane, a request from a mobile application to be inserted into an application layer of the communications network utilizing different ones of the infrastructure resources of the control plane. The program instructions are further enabled while executing to characterize the mobile application and to retrieve a set of recommended ones of the different infrastructure resources for the characterization of the mobile application. Then, the program instructions compare those of the resources to be utilized by the mobile application to the set of recommended resources in order to identify a variance of resources and then to provision for use by the mobile application in the control plane, those of the resources to be utilized by the mobile application adjusted by the variance of resources.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for northbound intent-based application insertion into an SDN architected mobile communications network. In accordance with an embodiment of the invention, in response to a request by a mobile application to provision resources in the control plane of the SDN architected a mobile communications network, a network controller in the control plane characterizes the mobile application in order to retrieve a selection of infrastructure resources expected to be required by the mobile application based upon its characterization. The network controller then compares the selection of resources to those resources specified by the mobile application through a northbound API of the SDN architected mobile communications network.

The network controller then computes a variance between the selection of resources for the characterization, and those resources specified by the mobile application. Based upon the computed variance, the network controller adjusts the specified resources of the mobile application at the time of provisioning in order to account for the variance, either by removing from provisioning excess resources specified by the mobile application that are not present in the selection of resources for the characterization of the mobile application, or the addition of resources included in the selection based upon the characterization, but absent in the specification by the mobile application. In this way, as the nature of the control plane and the resources offered therein dynamically change without the full knowledge by mobile applications seeking provisioning of the resources through the northbound API, the network controller can dynamically adjust the specified resources of the mobile application at the time of provisioning in order to account for the changes in the offered resources of which the mobile application remains unaware.

Figure 1:
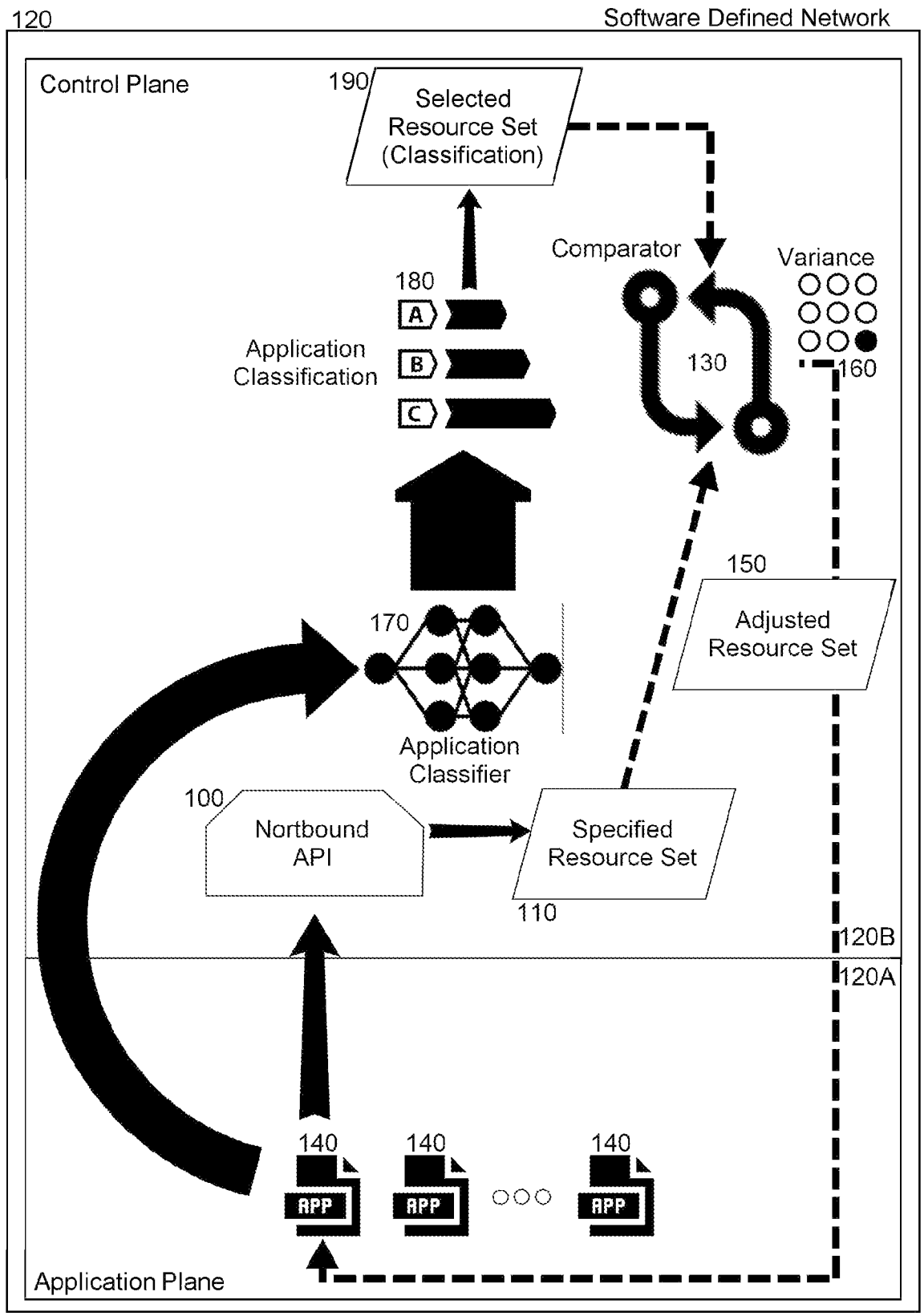
FIG. 1 is pictorial illustration of a process for northbound intent-based application insertion into a mobile communications network.

In further illustration, FIG. 1 pictorially shows a process for northbound intent-based application insertion into a mobile communications network. As shown in FIG. 1, different applications 140 operate within the application plane 120A of an SDN architected mobile communications network 120. Each of the applications 140 may direct the provisioning of a specified resource set 110 of infrastructure resources of a control plane 120 of the SDN architected mobile communications network 120 through a northbound API 100 defined within the control plane 120B. An application classifier 170 then classifies the requesting one of the applications 140 as having a generalized classification 180 for which a corresponding set of resources 190 may be selected.

In this regard, the application classifier 170 can receive meta-data describing the requesting one of the applications 140, for instance an application title, application identifier, or application publisher, to name three examples. In reference to a table (not shown), the classifier 170 can then assign a corresponding pre-determined classification. Alternatively, the meta-data describing the requesting one of the applications 140 can be submitted to a neural network trained to correlate elements of the meta data to the ground truth of an application classification. Regardless of the mode of classification, however, the classifier 170 ultimately assigns a classification 180 to the requesting one of the applications 140.

A comparator 130 compares the selected set of resources 190 for the classification 180 of the requesting one of the applications 140, to the specified resource set 110 provided by the requesting one of the applications 140 through the northbound API 100 in order to compute a variance 160—one or more resources present in one of the resource sets 110, 190 but not the other. Applying the variance 160 to the specified resource set 110, an adjusted resource set 150 is produced that includes as one example, additional resources than those set forth in the specified resource set 110, because the variance 160 reflects resources in the selected resource set 190 for the classification 180 that are not also present in the specified resource set 110. As another example, the adjusted resource set 150 is produced that includes fewer resources than those set forth in the specified resource set 110 because the variance 160 reflects resources in the specified resource set 110 that are not also present in the selected resource set 190 of the classification 180. Thereafter, the resources of the adjusted resource set 150 are provisioned in the control plane 120B for the benefit of the requesting one of the applications 140.

Figure 2:
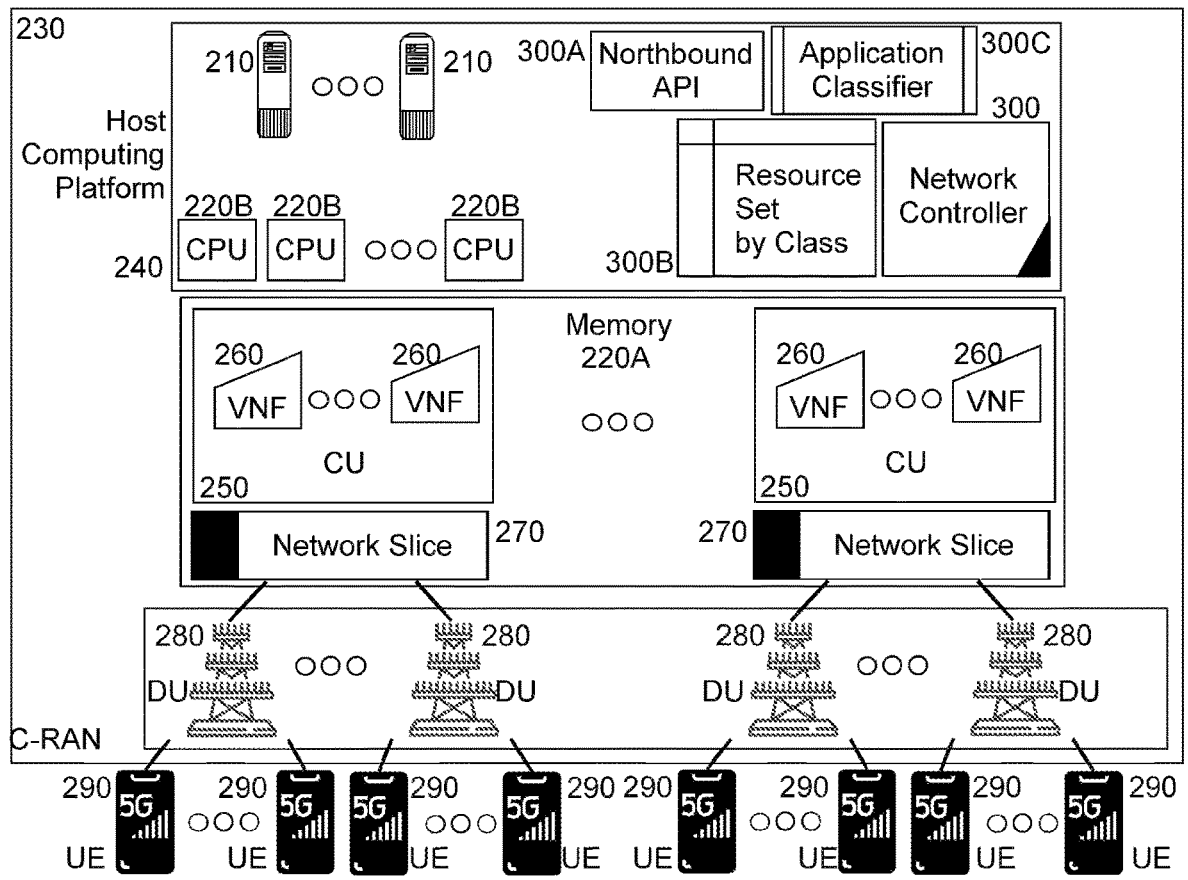
FIG. 2 is a schematic diagram of a computer data processing system adapted for northbound intent-based application insertion into a mobile communications network; and, FIG. 3 is a flow chart illustrating a process for northbound intent-based application insertion into a mobile communications network.

The process described in connection with FIG. 1 may be specifically embodied in an SDN architected mobile telecommunications network. In further illustration, FIG. 2 schematically shows a data processing system disposed within an SDN architected mobile telecommunications network adapted for northbound intent-based application insertion into a mobile communications network. The system includes a C-RAN 230 implemented in the control plane of an SDN. The C-RAN 230 includes a host computing platform 240 that includes one or more computers 210 each with memory 200A and one or more processors 220B. Multiple different centralized units (CUs) 250 for respective network slices 270 are defined in the memory 200A, each including one or more infrastructure resources 260, namely virtual network functions (VNFs), accessible by different mobile applications executing in an application plane of the SDN (not shown) in order to support processing of cellular network connections with different user equipment (UE) 290 through distributed units (DUs) 280.

Importantly, a network controller 300 is included in the host computing platform 240 and executes by at least one of the processors 220B of the host computing platform 240. The network controller 300 includes computer program instructions that when executing by one or more of the processors 220B, is enabled to process a request by one of the applications to provision one or more of the resources 260 through the northbound API 300A. But, prior to provisioning the requested ones of the resources 260, the program instructions of the network controller 300 direct application classifier 300C to classify the requesting application and to locate within a table 300B, a set of the resources 260 selected for provisioning when deploying an application of the same classification as the requesting application.

The program instructions of the network controller 300 then determine an adjusted set of the requested ones of the resources 260 to either augment the requested ones of the resources 260 or reduce the requested ones of the resources 260 based upon a variance computed as between the requested ones of the resources 260 and the set of the resources 260 specified in the table 300B. Finally, the program instructions provision the adjusted set of the requested ones of the resources 260 for the benefit of the requesting application.

Figure 3:
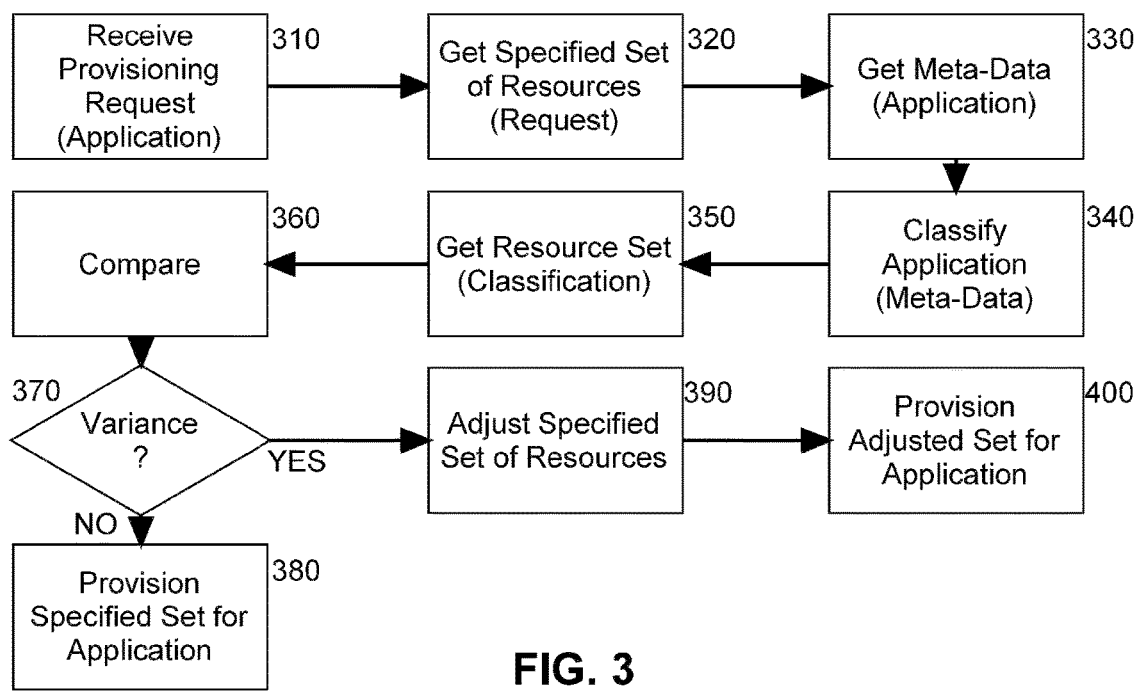

In even further illustration of the operation of the network controller 300, FIG. 3 is a flow chart illustrating a process for northbound intent-based application insertion into a mobile communications network. Beginning in block 310, a provisioning request for a specified set of resources is received in the northbound API of the control plane of an SDN from a requesting mobile application deployed within an application plane of the SDN. In block 320, the specified set of resources is determined and in block 330, meta-data characterizing the application received. In block 340, the application is classified based upon the meta-data and in block 350, a selection of resources retrieved for the classification.

In block 360, the selection of resources is compared to the specified set of resources in order to compute a variance. In decision block 370, it is determined if a variance exists between the selection of resources and the specified set of resources—that is to say, if either includes one or more resources not present in the other. If not, in block 380 the specified set of resources are allocated to the requesting application. But, in decision block 370 if a variance is computed, in block 390 the specified set of resources is adjusted to exclude resources in the specified set not also set forth in the selection of resources, and to include resources in the specified set not already present but set forth in the selection of resources. The resulting adjusted set of resources are then provisioned for the benefit of the requesting application in block 400.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include", "includes", and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for northbound intent-based application insertion into a mobile communications network established with a software defined network (SDN) and comprising both an applications plane and a control plane the method comprising:

rendering different infrastructure resources accessible through a northbound application programming interface (API) defined within the control plane of the SDN;

receiving in a network controller of the control plane of the mobile communications network, a request from a mobile application to be inserted into the applications plane utilizing different ones of the infrastructure resources of the control plane;

characterizing the mobile application with application meta-data of the mobile application by a classifier in communication with the network controller;

locating within a table, a set of recommended ones of the different infrastructure resources corresponding to the characterization of the mobile application;

comparing those of the resources to be utilized by the mobile application to the set of recommended resources in order to identify a variance of resources; and, provisioning through the northbound API for use by the mobile application in the application plane, the resources in the control plane to be utilized by the mobile application adjusted by the variance of resources.

2. The method of claim 1, wherein the variance is additional ones of the different resources included in the set of recommended resources but not included in the resources to be utilized by the mobile application so as to adjust the resources to be utilized by the mobile application by adding the additional ones of the different resources to the provisioning.

3. The method of claim 1, wherein the variance is additional ones of the different resources included in the resources to be utilized by the mobile application but not included in the set of recommended resources so as to adjust the resources to be utilized by the mobile application by removing the additional ones of the different resources from the provisioning.

4. The method of claim 1, wherein the resources to be utilized by the mobile application are specified by the mobile application through the northbound API.

5. The method of claim 1, wherein the resources to be utilized by the mobile application are correlated with the characterization of the mobile application.

6. The method of claim 5, wherein the correlation is determined by submitting meta-data associated with the mobile application to a classifier trained to produce a characterization responsive to application meta-data.

7. A data processing system adapted for northbound intent-based application insertion into a mobile communications network, the system comprising:

a host computing platform disposed within a central unit (CU) of a software defined network (SDN) architected cellular communications network comprising both an applications plane and a control plane, the CU comprising a communicative coupling to a multiplicity of different distributed units (DUs), at least one of the DUs comprising a massive multiple input, multiple output (MIMO) antenna transmitting over millimeter wave frequencies, the platform comprising one or more computers, each comprising memory and at least one processor; and, a network controller disposed within a control plane defined by the SDN and comprising computer program instructions enabled while executing in the host computing platform to perform:

rendering different infrastructure resources accessible through a northbound application programming interface (API) defined within the control plane of the SDN;

receiving in the network controller of the control plane of the mobile communications network, a request from a mobile application to be inserted into the applications plane utilizing different ones of the infrastructure resources of the control plane;

characterizing the mobile application with application meta-data of the mobile application by a classifier in communication with the network controller;

locating within a table, a set of recommended ones of the different infrastructure resources corresponding to the characterization of the mobile application;

comparing those of the resources to be utilized by the mobile application to the set of recommended resources in order to identify a variance of resources; and, provisioning through the northbound API for use by the mobile application in the application plane, the resources in the control plane to be utilized by the mobile application adjusted by the variance of resources.

8. The system of claim 7, wherein the variance is additional ones of the different resources included in the set of recommended resources but not included in the resources to be utilized by the mobile application so as to adjust the resources to be utilized by the mobile application by adding the additional ones of the different resources to the provisioning.

9. The system of claim 7, wherein the variance is additional ones of the different resources included in the resources to be utilized by the mobile application but not included in the set of recommended resources so as to adjust the resources to be utilized by the mobile application by removing the additional ones of the different resources from the provisioning.

10. The system of claim 7, wherein the resources to be utilized by the mobile application are specified by the mobile application through the northbound API.

11. The system of claim 7, wherein the resources to be utilized by the mobile application are correlated with the characterization of the mobile application.

12. The system of claim 11, wherein the correlation is determined by submitting meta-data associated with the mobile application to a classifier trained to produce a characterization responsive to application meta-data.

13. A computer program product for northbound intent-based application insertion into a mobile communications network comprising a mobile communications network established with a software defined network (SDN) and comprising both an applications plane and a control plane, the computer program product including a non-transitory computer readable storage medium having program instructions embodied therewith, the program instructions executable by a device to cause the device to perform a method including:

rendering different infrastructure resources accessible through a northbound application programming interface (API) defined within the control plane of the SDN;

receiving in a network controller of the control plane of the mobile communications network, a request from a mobile application to be inserted into the applications plane utilizing different ones of the infrastructure resources of the control plane;

characterizing the mobile application with application meta-data of the mobile application by a classifier in communication with the network controller;

locating within a table, a set of recommended ones of the different infrastructure resources corresponding to the characterization of the mobile application;

comparing those of the resources to be utilized by the mobile application to the set of recommended resources in order to identify a variance of resources; and, provisioning through the northbound API for use by the mobile application in the application plane, the resources in the control plane to be utilized by the mobile application adjusted by the variance of resources.

14. The computer program product of claim 13, wherein the variance is additional ones of the different resources included in the set of recommended resources but not included in the resources to be utilized by the mobile application so as to adjust the resources to be utilized by the mobile application by adding the additional ones of the different resources to the provisioning.

15. The computer program product of claim 13, wherein the variance is additional ones of the different resources included in the resources to be utilized by the mobile application but not included in the set of recommended resources so as to adjust the resources to be utilized by the mobile application by removing the additional ones of the different resources from the provisioning.

16. The computer program product of claim 13, wherein the resources to be utilized by the mobile application are specified by the mobile application through the northbound API.

17. The computer program product of claim 13, wherein the resources to be utilized by the mobile application are correlated with the characterization of the mobile application.

18. The computer program product of claim 17, wherein the correlation is determined by submitting meta-data associated with the mobile application to a classifier trained to produce a characterization responsive to application meta-data.

* * * * *